J. T. COWIE.
CHILD'S FEEDER NIPPLE.
APPLICATION FILED SEPT. 9, 1919.
1,360,893.
Patented Nov. 30, 1920.
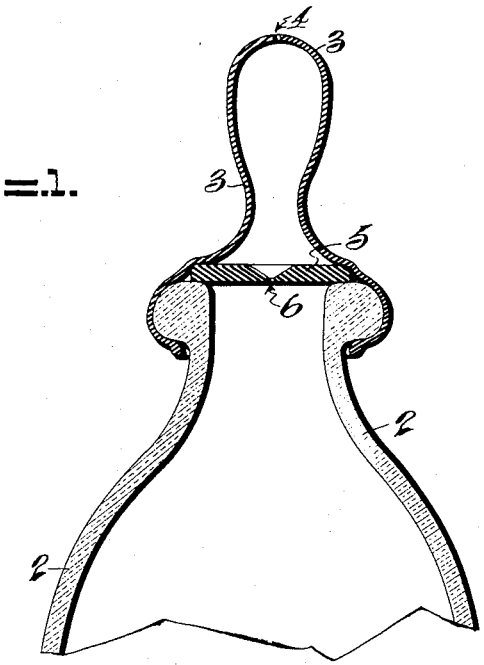
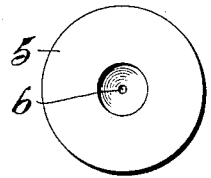
Inventor
John T. Cowie.
By Fred G. Dieterich
Attorneys

UNITED STATES PATENT OFFICE.

JOHN T. COWIE, OF NANAIMO, BRITISH COLUMBIA, CANADA.

CHILD'S FEEDER-NIPPLE.

1,360,893.   Specification of Letters Patent.   Patented Nov. 30, 1920.

Application filed September 9, 1919. Serial No. 322,748.

*To all whom it may concern:*

Be it known that I, JOHN T. COWIE, citizen of the Dominion of Canada, residing at Nanaimo, in the Province of British Columbia, Canada, have invented certain new and useful Improvements in Children's Feeder-Nipples, of which the following is a specification.

This invention relates to a means for regulating the amount of liquid that may pass to the nipple of a child's bottle feeder, so as to render the amount of liquid passing to the child independent of the aperture in the nipple.

It is somewhat difficult to satisfactorily aperture to a child's requirements the soft rubber of which feeder nipples are usually made. The rubber may be punctured easily but cannot readily be accurately apertured, and as a result the amount that passes through the nipple is either too small or too large for the child's requirements.

This difficulty is overcome by the means set forth in the following specification, reference being made to the drawings by which it is accompanied, in which:

Figure 1 is a vertical section through the neck end of the feeder bottle and its nipple showing the feed regulator applied thereto, and Fig. 2 is a plan of the apertured regulating washer.

In these drawings 2 represents the neck end of a child's feeder bottle and 3 the nipple of soft rubber applied thereto, 4 being the end aperture of the nipple. I interpose between the enlargement of the nipple 3 adjacent its connection to the neck 2 of the bottle, a washer 5 of substantially rigid sanitary material, such as hard vulcanite, which washer is centrally apertured at 6, a countersink being provided surrounding the aperture so as to shorten the length of the aperture and render it less likely to be obstructed.

With this provision the aperture 6 definitely regulates the amount of feed to the child's requirements and the washers may be furnished with various sizes of apertures—coarse, medium and fine.

Having now particularly described my invention, I hereby declare that what I claim as new and desire to be protected in by Letters Patent, is:

1. The combination with the neck of a child's feeder bottle and the soft rubber nipple connected thereto, of an apertured washer of substantially rigid material interposed between the end of the bottle neck and the nipple, said apertured washer being provided with a countersink portion in the outer side, said countersink portion being provided to reduce the length of the aperture to the minimum.

2. The combination with the neck of a child's feeder bottle and the soft rubber nipple connected thereto, of an apertured washer of substantially rigid material interposed between the end of the bottle neck and the nipple to be retained in position thereby, said apertured washer being provided with a countersink portion in the outer side, said countersink portion being provided to reduce the length of the aperture to the minimum.

In testimony whereof I affix my signature.

JOHN T. COWIE.